(12) United States Patent
Walker et al.

(10) Patent No.: US 11,421,479 B2
(45) Date of Patent: Aug. 23, 2022

(54) POWER SWIVEL AND LUBRICATION SYSTEM

(71) Applicant: National Oilwell Varco, L.P., Houston, TX (US)

(72) Inventors: Christopher Brian Walker, Cypress, TX (US); Henry Do, Katy, TX (US); Robert Ioan Papp, Houston, TX (US); Mihail Puscas, Rosenberg, TX (US); Calvin Ronald Blankenship, Katy, TX (US)

(73) Assignee: National Oilwell Varco, L.P., Houston, TX (US)

( * ) Notice: Subject to any disclaimer, the term of this patent is extended or adjusted under 35 U.S.C. 154(b) by 142 days.

(21) Appl. No.: 15/770,441

(22) PCT Filed: Oct. 19, 2016

(86) PCT No.: PCT/US2016/057697
§ 371 (c)(1),
(2) Date: Apr. 23, 2018

(87) PCT Pub. No.: WO2017/070206
PCT Pub. Date: Apr. 27, 2017

(65) Prior Publication Data
US 2018/0313154 A1 Nov. 1, 2018

Related U.S. Application Data
(60) Provisional application No. 62/245,494, filed on Oct. 23, 2015.

(51) Int. Cl.
*E21B 3/04* (2006.01)
*F16H 57/12* (2006.01)
(Continued)

(52) U.S. Cl.
CPC .............. *E21B 3/04* (2013.01); *E21B 3/02* (2013.01); *F16H 57/04* (2013.01);
(Continued)

(58) Field of Classification Search
CPC ......... F16H 57/0456; F16H 57/04; E21B 3/02
(Continued)

(56) References Cited

U.S. PATENT DOCUMENTS 4,340,121 A * 7/1982 Bailey ................. B25D 17/265
173/206
4,574,893 A * 3/1986 Young ...................... E21B 3/02
173/217

(Continued)

FOREIGN PATENT DOCUMENTS

CN 201753583 U * 3/2011
CN 201753583 U 3/2011
(Continued)

OTHER PUBLICATIONS

CN 201753583 U—Machine Translation into English, by Espacenet (Year: 2011).*
(Continued)

*Primary Examiner* — Anna K Kinsaul
*Assistant Examiner* — Himchan Song
(74) *Attorney, Agent, or Firm* — Conley Rose, P.C.

(57) ABSTRACT

A power swivel is disclosed that is configured to rotate tubular string and drill bit to form or extend a subterranean borehole. In an embodiment, the power swivel includes a motor, a gear box coupled to the motor, and a lubrication system coupled to the gear box. The lubrication system includes a pump disposed within the gear box, the pump including an outlet. In addition, the lubrication system includes a recirculation line fluidly coupled to the outlet of the pump. Further, the lubrication system includes a first (Continued)

injector fluidly coupled to the recirculation line. The injector is configured to deliver lubricant to one of a bearing and a gear disposed within the gear box.

17 Claims, 6 Drawing Sheets

(51) Int. Cl.
  *F16H 57/04* (2010.01)
  *E21B 3/02* (2006.01)
(52) U.S. Cl.
  CPC ..... *F16H 57/0436* (2013.01); *F16H 57/0456* (2013.01); *F16H 57/0471* (2013.01); *F16H 57/0486* (2013.01); *F16H 57/12* (2013.01)
(58) Field of Classification Search
  USPC .............. 173/197; 166/77.1; 175/24; 285/16
  See application file for complete search history.

(56) References Cited

U.S. PATENT DOCUMENTS

| | | | | |
|---|---|---|---|---|
| 4,678,045 | A * | 7/1987 | Lyons | E21B 4/00 |
| | | | | 175/100 |
| 7,770,668 | B2 * | 8/2010 | Kruse | E21B 3/02 |
| | | | | 175/170 |
| 2001/0050168 | A1 * | 12/2001 | Hult | E21B 43/121 |
| | | | | 166/68.5 |
| 2005/0274508 | A1 * | 12/2005 | Folk | E21B 19/02 |
| | | | | 166/77.52 |
| 2008/0136109 | A1 | 6/2008 | West et al. | |
| 2012/0292114 | A1 * | 11/2012 | Keskiniva | E21B 6/00 |
| | | | | 175/57 |
| 2014/0166270 | A1 * | 6/2014 | Varkey | E21B 7/02 |
| | | | | 166/250.01 |
| 2014/0360743 | A1 * | 12/2014 | Muuttonen | B23Q 11/12 |
| | | | | 173/1 |
| 2017/0044832 | A1 * | 2/2017 | Hanna | E21B 3/02 |

FOREIGN PATENT DOCUMENTS

| | | | |
|---|---|---|---|
| CN | 103982132 A | * | 8/2014 |
| DE | 29707295 U1 | | 7/1997 |

OTHER PUBLICATIONS

ESPACENET machine translation of Lei CN 103982132 A (Year: 2014).*
International Patent Application No. PCT/US2016/057697 International Search Report and Written Opinion dated Jan. 17, 2017 (11 pages).
GCC Patent Application No. GC 2016-32228 Examination Report dated Aug. 30, 2019 (3 pages).
GCC Patent Application No. GC 2016-32228 Examination Report dated May 30, 2020 (4 pages).

* cited by examiner

POWER SWIVEL AND LUBRICATION SYSTEM

CROSS-REFERENCE TO RELATED APPLICATIONS

This application is a 35 U.S.C. § 371 national stage entry of PCT/US2016/057697, filed Oct. 19, 2016, and entitled "Power Swivel and Lubrication System," which claims the benefit of U.S. provisional patent application Ser. No. 62/245,494 filed Oct. 23, 2015, and entitled "Power Swivel and Lubrication System," the contents of each are hereby incorporated herein by reference in their entirety.

STATEMENT REGARDING FEDERALLY SPONSORED RESEARCH OR DEVELOPMENT

Not applicable.

BACKGROUND

This disclosure generally relates to drilling a subterranean well for the recovery of hydrocarbons. More particularly, this disclosure related to power swivels for drilling a subterranean wellbore.

A power swivel is used to drive rotation of a tubular string and drill bit to form or extend a subterranean wellbore. The power swivel may be driven, in at least some examples, by a hydraulic motor that transfers torque to the drill bit and attached drill string through a gear box. The gear box includes a plurality of meshed gears and bearings that support and facilitate the torque transfer from the motor to the drill string (and thus the drill bit attached thereto). The meshed gears and bearings require lubrication in order to ensure proper operation and to guard against premature wear and/or failure.

BRIEF SUMMARY OF THE DISCLOSURE

Some embodiments disclosed herein are directed to a power swivel configured to rotate tubular string and drill bit to form or extend a subterranean borehole. In an embodiment, the power swivel includes a motor and a gear box coupled to the motor. In addition, the power swivel includes a lubrication system coupled to the gear box. The lubrication system includes a pump disposed within the gear box, the pump including an outlet. In addition, the lubrication system includes a recirculation line fluidly coupled to the outlet of the pump. Further, the lubrication system includes a first injector fluidly coupled to the recirculation line. The injector is configured to deliver lubricant to at least one of a bearing and a gear disposed within the gear box.

In some embodiments, the gear box is configured to be filled with lubricant to a fill line and comprises at least a pair of mated gears therein, wherein the pump is at least partially below the fill line, and the pair of mated gears and the bearing are at least partially above the fill line.

In some embodiments, the recirculation line at least partially extends outside of the gear box and is configured to facilitate a transfer of thermal energy from the lubricant to an outer environment surrounding the gear box.

The pump may be configured to be driven by the motor to discharge lubricant from the outlet, and in some embodiments, the motor is rotatable in a first direction, and a second direction that is opposite the first direction; the pump being configured to discharge lubricant from the outlet and into the recirculation line both when the motor is rotating in the first direction and when it is rotating in the second direction.

In some embodiments, the lubrication system further comprises: a lubricant manifold; and a second injector, wherein: the second injector is configured to deliver lubricant to the bearing; the first injector is configured to deliver lubricant to the gear; and the manifold is coupled to the recirculation line, the first injector, and the second injector.

Other embodiments disclosed herein are directed to a power swivel configured to rotate tubular string and drill bit to form or extend a subterranean borehole. In an embodiment, the power swivel includes a motor and a gear box coupled to the motor. In addition, the power swivel includes a lubrication system coupled to the gear box. The lubrication system includes a pump including an outlet, wherein the pump is configured so as to be driven by the motor to discharge lubricant from the outlet. In addition, the lubrication system includes a recirculation line fluidly coupled to the outlet of the pump. Further, the lubrication system includes a first injector fluidly coupled to the recirculation line. The first injector is configured to deliver lubricant to one of a gear and a bearing disposed within the gear box.

In another disclosed embodiment, a power swivel configured to rotate a tubular drill string comprises: a motor rotatable in a first direction and in a second direction that is opposite the first direction; a gear box coupled to the motor; and a lubrication system coupled to the gear box. The lubrication system comprises: a pump including an outlet, wherein the pump is configured to be driven by the motor and to discharge lubricant from the outlet when the motor is rotating in the first direction and when the motor is rotating the second direction. The lubrication system further comprises: a recirculation line fluidly coupled to the outlet of the pump to receive lubricant that is discharged from the pump outlet, at least a segment of the recirculation line extending outside the gear box; and a first injector fluidly coupled to the recirculation line and configured to deliver lubricant to at least one of a gear and a bearing disposed within the gear box.

In some embodiments, the lubrication system further comprises: a manifold fluidly coupled to the recirculation line, the first injector fluidly coupled to the manifold and to a first fluid delivery line that is configured to deliver lubricant to the gear; and a second injector fluidly coupled to the manifold and to a second lubricant delivery tube that is configured to deliver lubricant to the bearing; wherein the first and second lubricant delivery lines and the first and second injectors are configured to deliver at least a predetermined minimum amount of lubricant to the gear and bearing when the motor is operating at a minimum output.

In some embodiments, the power swivel further comprises a pressure relief valve coupled to the manifold and configured to emit lubricant outside of the lubrication system if the pressure of the lubricant within the manifold exceeds a predetermined limit.

The recirculation line may be of metal and may include heat transfer elements. In some embodiments, the segment of the recirculation line extending outside the gear box may include fins, and in some embodiments, the segment of the recirculation line extending outside the gear box is configured to be cooled by a coolant.

Embodiments described herein comprise a combination of features and advantages intended to address various shortcomings associated with certain prior devices, systems, and methods. The foregoing has outlined rather broadly the features and technical advantages of the disclosed embodiments in order that the detailed description that follows may be better understood. The various characteristics described above, as well as other features, will be readily apparent to those skilled in the art upon reading the following detailed description, and by referring to the accompanying drawings. It should be appreciated by those of ordinary skill in the art that the conception and the specific embodiments disclosed may be readily utilized as a basis for modifying or designing other structures for carrying out the same purposes as the disclosed embodiments. It should also be realized by those of ordinary skill in the art that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

Figure 1:
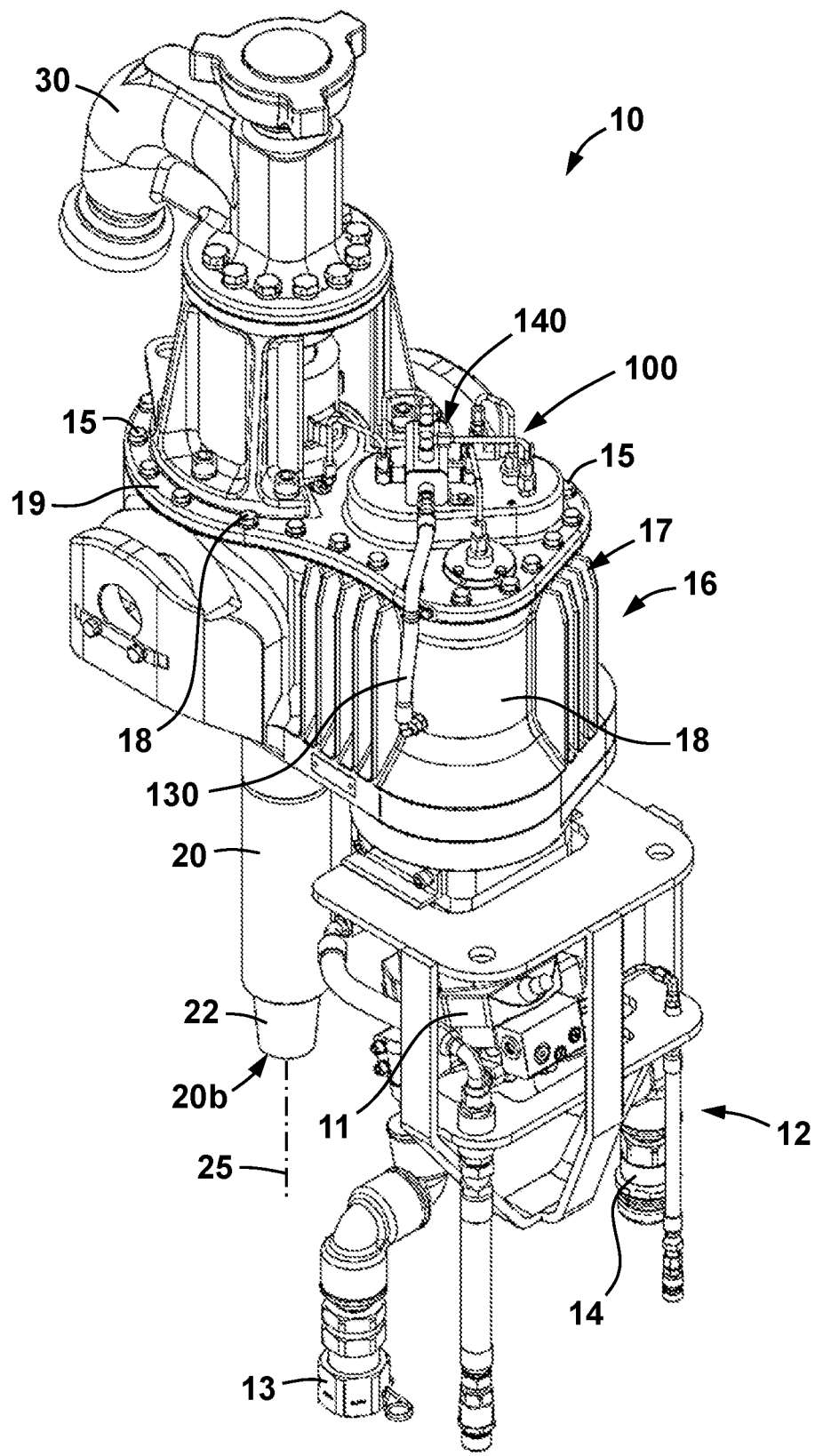
FIG. 1 is a perspective view of a power swivel including a lubricant circulation system in accordance with at least some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct physical engagement of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, the meshed gears and bearings in the gear box of a power swivel require lubrication in order to ensure proper operation and to guard against premature wear and/or failure. Conventionally, a power swivel gear box is partially filled with a lubricant such that the gears and bearings disposed at the lower end of the gear box are at least partially submerged therein. For such a design, the aim is to harness the dynamic movement of the gears and/or bearings that are submerged in the lubricant to sling, splash, or otherwise direct at least some of the lubricant onto the gears and/or bearings that are not submerged therein. However, these systems typically do not provide a consistent and/or adequate lubricant supply to the gears and/or bearings disposed in the upper portion of the gear box. In addition, overfilling of the gear box with lubricant can lead to an over pressurization of the outer housing of gear box and can cause the internal temperature of the gear box to rise above an acceptable limit during operations. Thus, embodiments disclosed herein include lubricant circulation systems for a power swivel that provide lubricant to a plurality of gears and/or bears disposed in the upper portion of the gear box, to thereby ensure that these components receive a consistent and adequate supply of lubricant while avoiding overfilling of lubricant within the gear box during operations.

Figure 2:
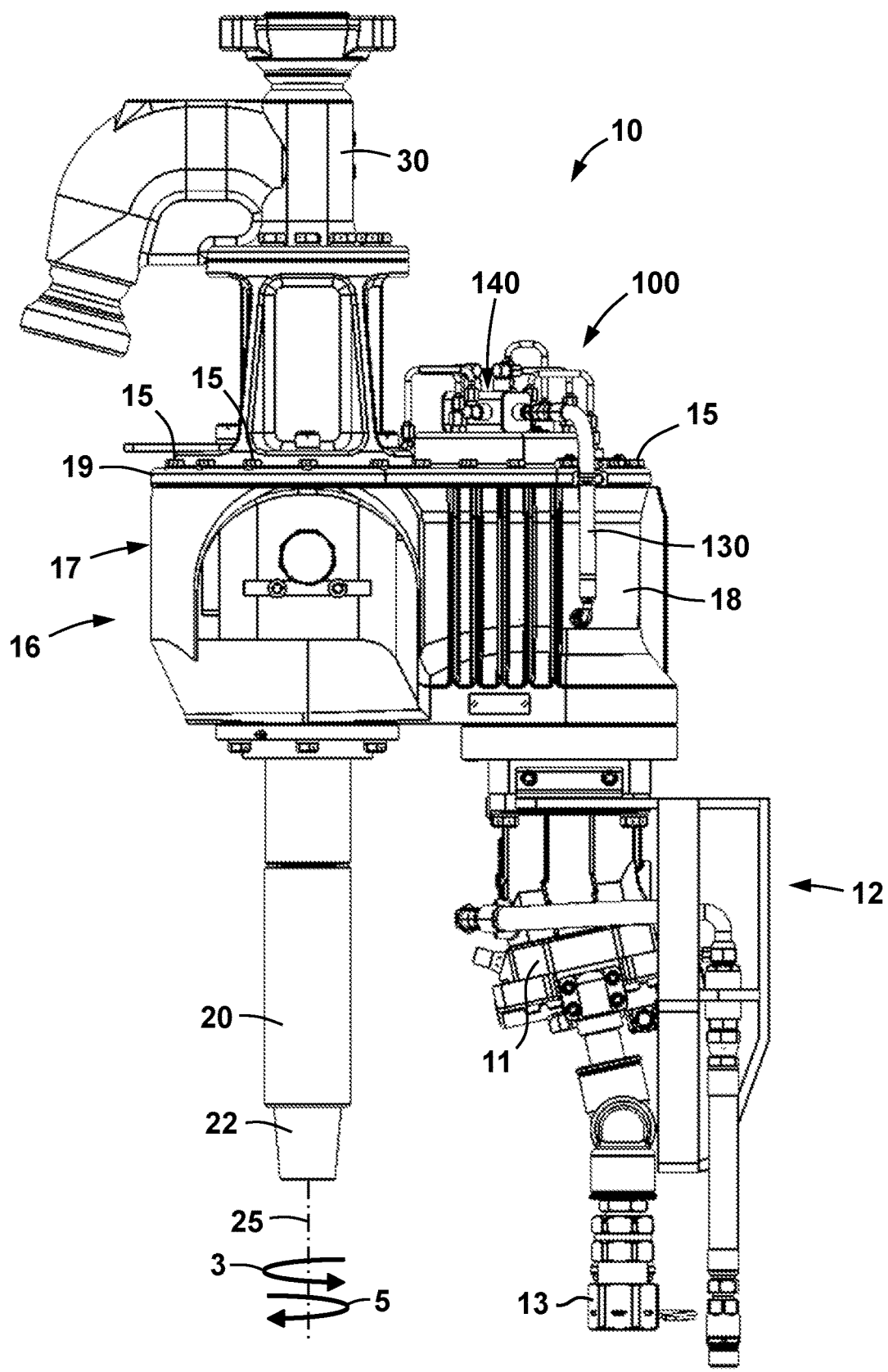
FIG. 2 is a side view of the power swivel of FIG. 1.

Referring now to FIGS. 1 and 2, a power swivel 10 for rotating a tubular string (e.g., a drill string) to form or extend a subterranean borehole is shown. In general, power swivel 10 includes a motor 12, a gear box 16, a stem 20, and a gooseneck 30. Motor 12 may be any suitable motor or other driving mechanism that is configured to output a torque to drive rotation of stem 20 (and thus the tubular string coupled thereto). For example, in some embodiments, motor 12 comprises a hydraulic motor, electric motor, an internal combustion engine, or some combination thereof. In this embodiment, motor 12 comprises a hydraulic motor and includes a motor body 11, an inlet 13, and an outlet 14 (outlet is shown in FIG. 1). During operations, inlet 13 receives a flow of pressurized fluid (e.g., hydraulic fluid) and routes the same through motor body 11 and out from outlet 14. Forcing the pressurized fluid through motor body 11 causes an output shaft (e.g., see output shaft 124 in FIG. 3) to rotate. Upon being routed through motor body 11, the now spent fluid is emitted from outlet 14 where it may then be recirculated, re-pressurized, and flowed back to inlet 11 or simply discarded.

Gear box 16 includes an outer housing 17 that encloses one or more gears (e.g., gears 147 shown in FIG. 5), bearings (e.g., bearing 145 shown in FIG. 4), and/or other torque transfer devices that transfer the torque generated by motor 12 to stem 20. Housing 17 includes a main casing body 18 and a top or lid 19 secured to body 18 with a plurality of coupling members 15. Coupling members 15 may be any suitable member or device for joining and securing two components to one another, and may include, for example, screws, bolts, rivets, etc. Regarding the internal configuration of the gears, bearings, etc. within housing 17 of gear box 16, one of ordinary skill will appreciate that the internal gears or other torque transfer devices within gear box 16 may be disposed in various known configurations or designs, which have no particular bearing on the scope of this disclosure. Thus, a detailed discussion of the internal configuration of the gears, shafts, bearings, etc. within gear box 16 is omitted herein in the interests of brevity.

Referring still to FIG. 2, stem 20 is used to transfer the torque generated by motor 12 to a tubular string and drill bit (not shown) during operations. As shown, stem 20 comprises a tubular member including a central or longitudinal axis 25, a first end disposed within outer housing 17 of gear box 16 (and therefore not shown), and a second or lower end 20b extending outward from outer housing 17. Lower end 20b includes a threaded connector 22, which in this embodiment comprises a threaded pin connector having a plurality of external threads for coupling with a threaded box connector on an upper end of the tubular string (not shown). As previously mentioned above, stem 20 is operationally coupled to motor 12 via the gears and/or other torque transfer devices within gear box 16 such that rotation of the output shaft of motor 12 (not specifically shown in FIGS. 1 and 2) causes a corresponding rotation of stem 20 about axis 25. When stem 20 is coupled to a tubular string (e.g., at threaded connector 22) that extends into a subterranean borehole, the rotation of stem 20 about axis 25 also causes rotation of the tubular string and any tools that are disposed on the axially lower end thereof (e.g., a drill bit).

As is best shown in FIG. 2, in this embodiment flow of pressurized fluid from inlet 13 through motor body 11 and out of outlet 14 causes rotation of stem 20 in a first direction 3 about axis 25, while flow of pressurized fluid from outlet 14 through body 11 and out of inlet 13 causes stem 20 rotate in a second direction 5 about axis 25 that is opposite the first direction 3. Thus, references to inlet 13 as an "inlet" and outlet 14 as an "outlet" are merely made as a matter of convenience, and power swivel 10 may be operated to rotate stem 20 in either the first direction 3 or the second direction 5 during operations.

Generally speaking, during drilling operations with power swivel 10, a tubular string (not shown) is coupled to stem 20 at connector 22, and a drill bit is further secured to the axially opposite end of the tubular string. Thereafter, stem 20 is rotated about axis 25 (e.g., in direction 3 or 5) in the manner described above (i.e., by motor 12) to cause a corresponding rotation of the tubular string and drill bit. When drill bit is placed in contact with a subterranean formation, rotation of the drill bit (via power swivel 10) causes the bit to form or extend a borehole therein. During these drilling operations, drilling fluids (e.g., drilling mud) are supplied to stem 20 through a gooseneck 30 that is further coupled to a fluid source (e.g., a tank, pit, etc.). The drilling fluids are then emitted from lower end 20b of stem 20 and routed through the tubular string and drill bit in order to, among other things, cool the drill bit, lubricate the engagement between the bit and the formation, and carry cuttings of the formation back to the surface.

In addition, during the operation of power swivel 10, the various gears, bearings, and other torque transfer devices disposed within gear box 16 are lubricated with a lubricant circulation system 100 secured to and within gear box 16. The various features and functions of lubricant circulation system 100 will now be described in more detail below.

Figure 3:
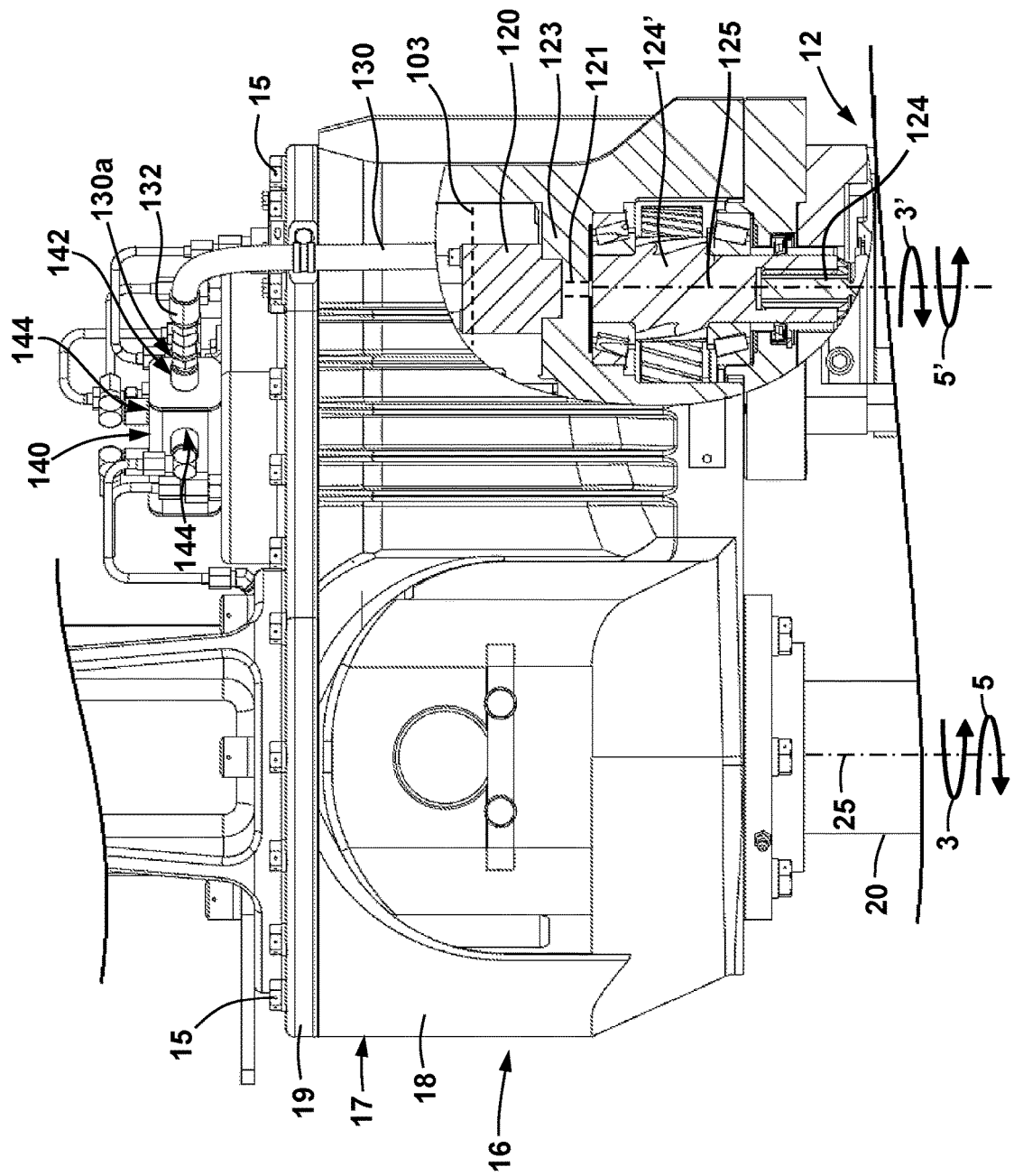
FIG. 3 is an enlarged side, partial cross-sectional view of the gear box and lubricant circulation system of FIG. 1.
Figure 4:
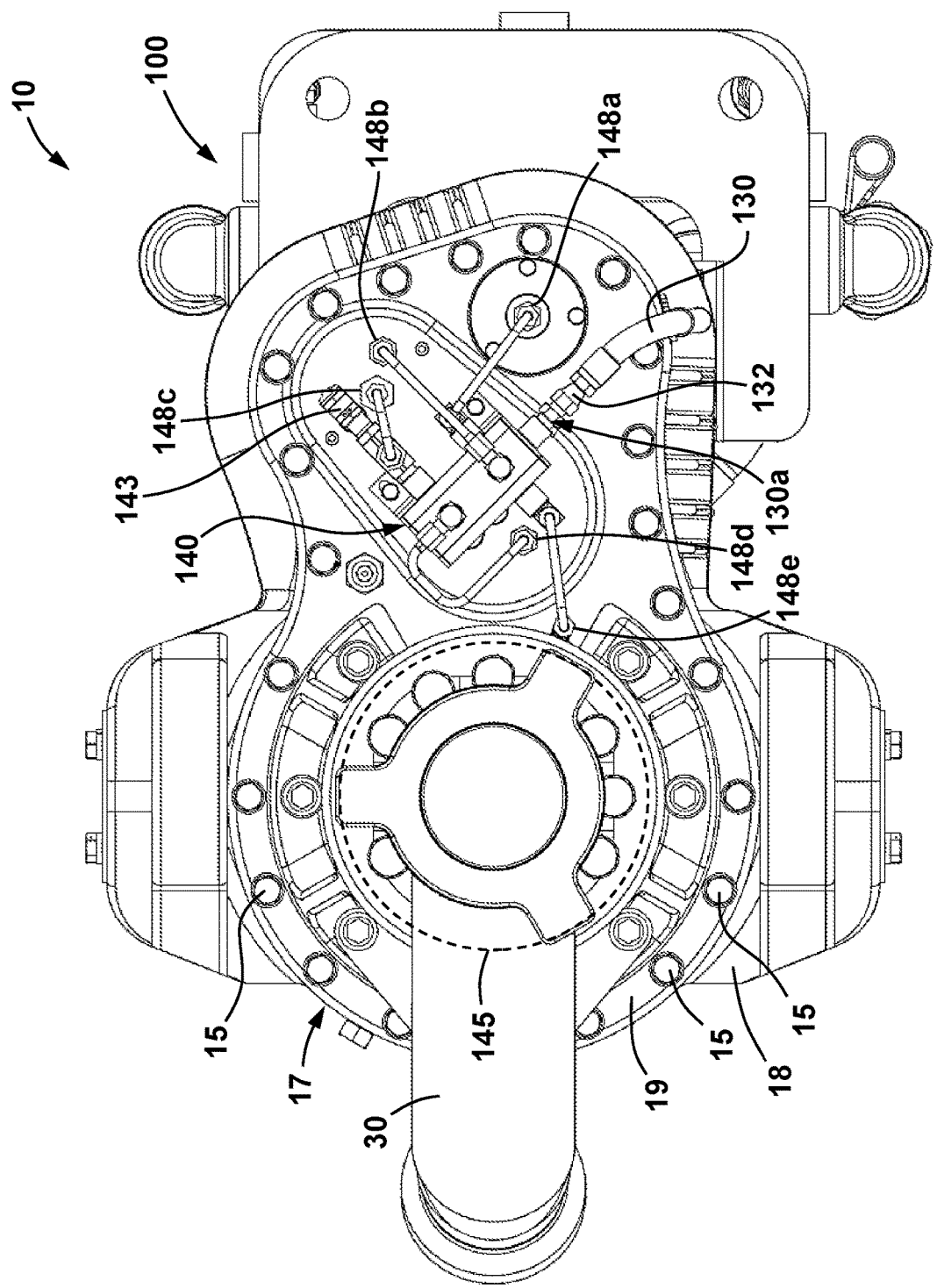
FIG. 4 is a top view of the power swivel of FIG. 1.
Figure 5:
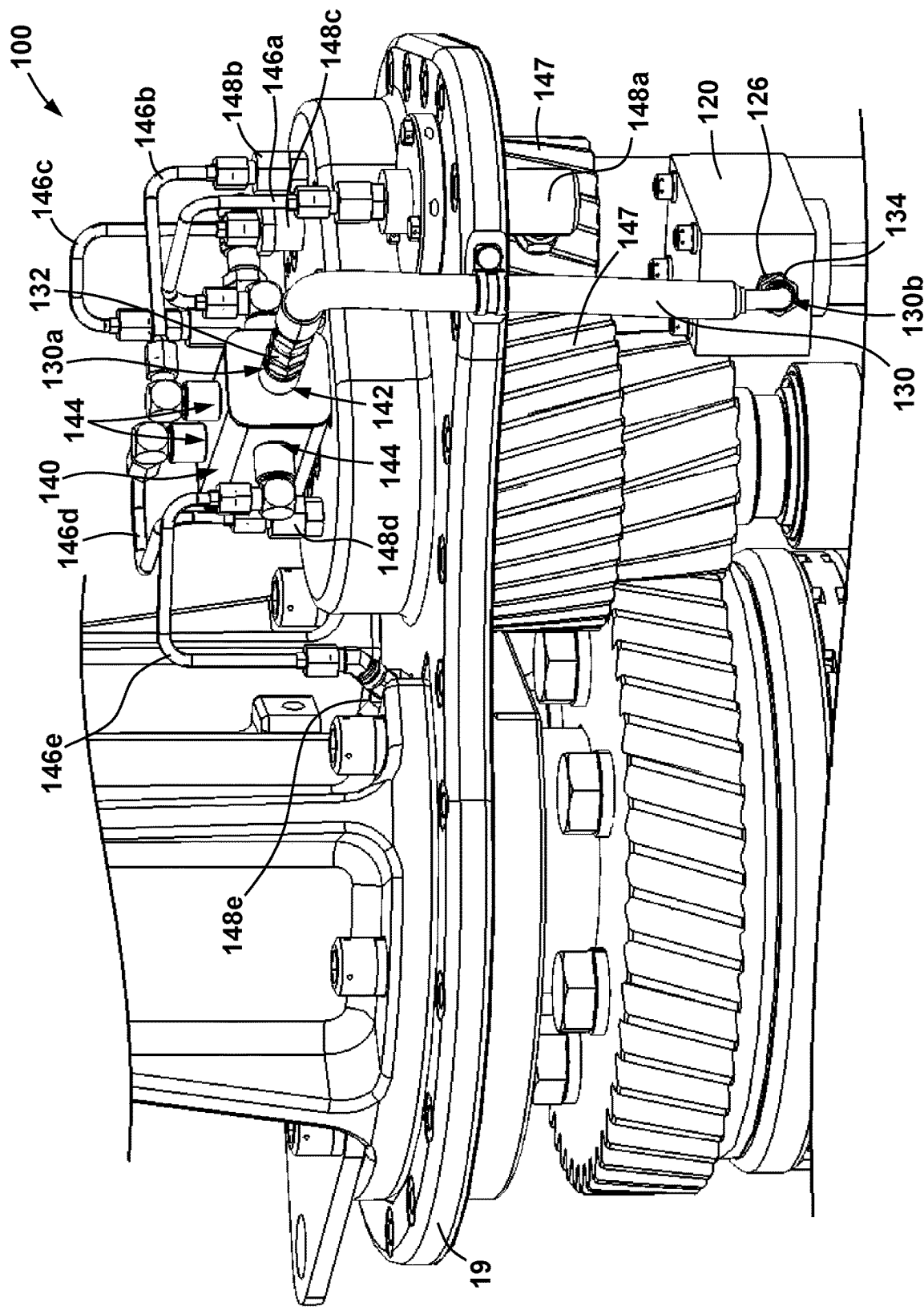
FIG. 5 is an enlarged perspective view of the gear box and lubricant circulation system of FIG. 1 with the main body of the housing of gear box removed to show the components of the lubricant circulation system.

Referring now to FIGS. 3-5, lubricant circulation system 100 generally includes a pump 120, a manifold 140, and a recirculation line 130. Pump 120 is disposed within main body 18 of housing 17. Specifically, as shown in FIG. 3, pump 120 is mounted to an internal partition or surface 123 within main body 18 such that pump 120 is at least partially below a liquid fill line 103. A "fill line" is a predetermined level to which liquid lubricant is to be filled within housing 17 prior to operation. In an embodiment, the fill line is marked, embossed, or otherwise designated on the housing. Pump 120 may comprise any suitable device for pressurizing a liquid or semi-liquid lubricant (e.g., oil). In this embodiment, pump 120 comprises a gear pump. In addition, pump 120 is operationally coupled to the output shaft 124 of motor 12 through an input gear 124' such that rotation of shaft 124 and gear 124' about a central shaft axis 125 (e.g., caused by flowing pressurized fluid through motor body 11 between inlet 13 and outlet 14 as previously described) also drives pump 120 to draw in lubricant disposed within housing 17, and then pressurize and emit the same through an output port 126 (see FIG. 5). As will be described in more detail below, output port 126 is connected to a fluid-conveying conduit referred to herein as recirculation line 130. Recirculation line 130 interconnects outlet port 126 and manifold 140, such that liquid lubricant that is emitted from output port 126 is communicated to manifold 140 through recirculation line 130.

Pump 120 may be operationally coupled to output shaft 124 through any suitable device(s) or method(s). For example, in this embodiment, pump 120 includes an input shaft 121 that extends through partition 123 and is secured to output shaft 124 of motor 12. Thus, rotation of output shaft 124 also causes rotation of input shaft 121, which thereby drives actuation of pump 120 (and pressurization of lubricant) as described above. Input shaft 121 pump 120 may be rotationally connected to output shaft 124 through a keyed connection, or some other suitable connection (e.g., welding, bolts, etc.). Further, as previously described, motor 12 may be operated to rotate stem 20 in two opposite directions 3, 5 (see also FIG. 2), which in this embodiment cause a corresponding rotation of shaft 124 about axis 125 in directions 3',5' respectively. As a result, pump 120 is configured to emit pressurized lubricant through output port 126 as output shaft 124 rotates about axis 125 in both directions 3',5'. Thus, lubricant circulation system 100 is configured to circulate lubricant within housing 17 regardless of the rotation direction of stem 20.

Figure 6:
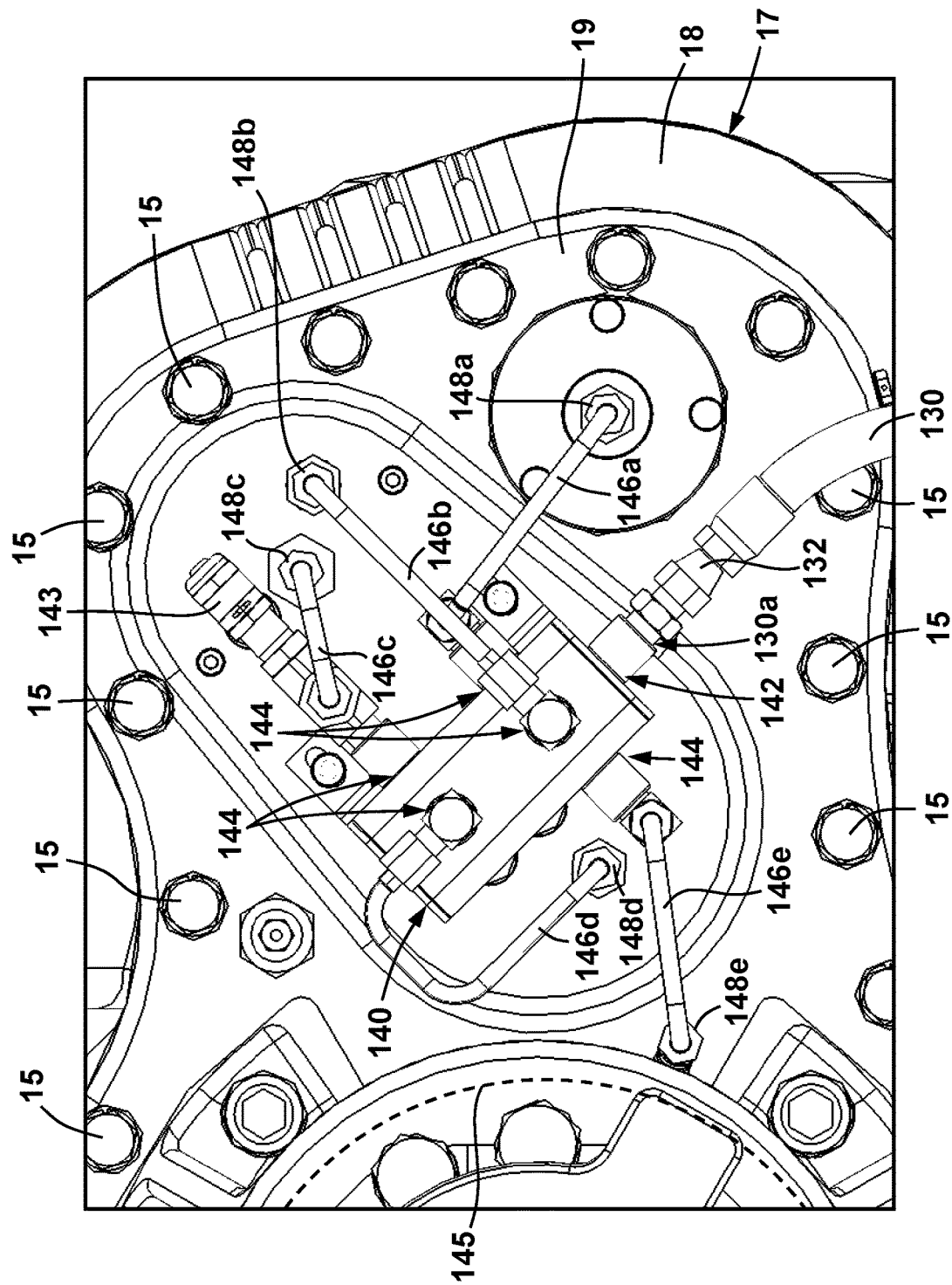
FIG. 6 is an enlarged top view of the power swivel of FIG. 1 detailing a portion of the lubricant circulation system.

Referring now to FIGS. 4 and 6, manifold 140 is a receptacle or vessel that receives pressurized lubricant from pump 120 and distributes the same to one or more lubrication injection points in gear box 16. Specifically, as best shown in FIG. 6, in this embodiment, manifold 140 comprises a rectangular shaped receptacle that includes an inlet 142 and a plurality of outlets 144. Inlet 142 is connected to recirculation line 130 to receive pressurized lubricant emitted from output port 126 of pump 120 as previously described. Outlets 144 are each coupled to an injection line that routes the pressurized lubricant to one of a plurality of injection points in gear box 16. Specifically, in this embodiment, a first injection line 146a routes lubricant from one of the outlets 144 to an injector 148 (see FIG. 5) that injects lubricant onto a pair of meshed gears 147 within housing 17. Additional injection lines 146b, 146c, 146d, 146e route lubricant from corresponding outlets 144 on manifold 140 to injectors 168b, 168c, 168d, 168e, respectively, that each inject lubricant into one of the plurality of bearings disposed within housing 17 that support rotation of the gears (e.g., gears 147) and stem 20 during operations. For example, one of the injectors 149e (which receives lubricant from manifold 140 via injection line 146e) routes lubricant to a stem bearing 145 that radially supports rotation of stem 20 about axis 25. It should be appreciated that the number, arrangement, and type of injectors (e.g., injectors 148a, 148b, 148c, 148d, 148e) may be greatly varied in other embodiments depending on the design of gear box 16 and the lubrication needs thereof. In addition, outlets 144, lines 146a, 146b, 146c, 146d, 146e, and injectors 148a, 148b, 148c, 148d, 148e are all sized to deliver at least a minimum desired amount of lubricant to the gears and bearings above line 103 within housing (e.g., gears 147, bearing 145, etc.) even when motor 12 is operating at a minimum output.

Referring still to FIGS. 4 and 6, manifold 140 also includes a relief valve 143 that emits lubricant to the outer environment when the pressure of the lubricant within manifold 140 reaches some predetermined limit. In some embodiments, the predetermined pressure limit within manifold 140 is set to prevent an over pressurization of pump 120, and may equal 250 pounds per square inch (psi). In this embodiment, the relief valve 143 is coupled to the body of manifold 140 via one of the outlets 144; however, in other embodiment, relief valve 143 may be coupled to any other portion of lubricant circulation system 100 (e.g., recirculation line 130, pump 120, etc.). In addition, in some embodiments, relief valve 143 may emit fluid to some other container or vessel when the pressure within manifold rises above the predetermined limit.

Referring now to FIG. 5, recirculation line 130 comprises a tubular member that has a first end 130*a*, and a second end 130*b* opposite to and in fluid communication with first end 130*a*. A first connector 132 is disposed at first end 130*a* that connects to inlet 142 of manifold 140, and a second connector 134 is disposed at second end 130*b* that extends through the wall of housing 17 (not shown in FIG. 5 for convenience) and connects to output port 126 of pump 120. During operations, recirculation line 130 routes pressurized lubricant from pump 120 to manifold 140 to ensure adequate supply of lubricant to injectors 148*a*, 148*b*, 148*c*, 148*d*, 148*e* as previously described. In addition, because recirculation line 130 is routed externally to housing 17, air may flow freely around recirculation line 130 during operations, thereby promoting heat transfer between the pressurized lubricant and the surrounding environment through, for example, radiative and convective heat transfer. In some embodiments, recirculation line 130 may include additional heat transfer elements and/or features, such as, for example, fins, to further enhance thermal heat transfer between lubricant and the outer environment. Further, in some embodiments, an additional heat exchanger may be coupled to or integrated with recirculation line 130. For example, in some embodiments, recirculation line 130 may split into a plurality of smaller lines or tubes that all fluidly communicate with both ends 130*a*, 130*b* to increase the surface area exposed to the outer environment (and therefore enhance thermal heat transfer). As another example, in some embodiments, a shell or outer covering may be disposed about recirculation line 130 in a region between ends 130*a*, 130*b* to receive and route a coolant fluid (e.g., oil, water, etc.) across at least a portion of the outer surface recirculation line 130. Thus, during operations, heat resulting from the operation of gears and bearings within gear box 16 is transferred to the lubricant injected at injectors 148*a*, 148*b*, 148*c*, 148*d*, 148*e* and then is transferred to the outer environment at recirculation line 130. In addition, in some embodiments, a filter may be disposed along recirculation line 130 or between line 130 and pump 120 or manifold 140 to remove particulates and/or other impurities from the lubricant before it is injected back in to housing 17 via injectors 148*a*, 148*b*, 148*c*, 148*d*, 148*e*.

Recirculation line 130 may be comprised out of any suitable material for receiving and circulating pressurized lubricant, such as, for example, a metal, an elastomer (e.g., rubber), a polymer, a composite material, etc. In some embodiments, recirculation line 130 may be constructed out of a highly conductive material (e.g., a metal) to further enhance heat transfer from the pressurized lubricant as described above.

Referring now to FIGS. 1, 3, and 5, as motor 12 of power swivel 10 drives rotation of stem 20 in the manner described above, lubricant circulation system 100 is driven by motor 12 to circulate lubricant in housing 17 to various injection points via the injectors 148*a*, 148*b*, 148*c*, 148*d*, 148*e*. Thus, lubricant circulation system ensures that all gears, bearings and other torque transfer equipment within gear box 16 receives an adequate supply of lubricant during operations, even if one of more of these components are disposed completely or partially above fill line 103 of lubricant within housing 17. In addition, during these operations, thermal energy (e.g., heat) generated by operation of gears and bearings in gear box 16 is transferred out of housing 17 via lubricant flowing through lubricant circulation system 100 to help ensure that lubricant, gears, bearings, etc. within housing 17 do not overheat during operation of power swivel 10. Thus, through use of a lubricant circulation system in accordance with the embodiments disclosed herein (e.g., lubricant circulation system 100), the operational life of a power swivel (e.g., power swivel 10) and associated components may be extended, thereby reducing maintenance costs associated with drilling subterranean wells with such equipment.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention claimed below. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A power swivel configured to rotate a tubular string and drill bit to form or extend a subterranean borehole, the power swivel comprising:
   a motor;
   a gear box coupled to the motor, the gear box comprising
      a gear box housing having an internal surface and comprising a plurality of gears disposed within the gear box housing; and
   a lubrication system coupled to the gear box, the lubrication system including:
      a pump including a pump housing disposed within the gear box housing and supported from the internal surface, the pump including an outlet;
      a recirculation line fluidly coupled to the outlet of the pump, wherein at least a portion of the recirculation line extends outside of the gear box housing to facilitate a transfer of thermal energy from a preassurized lubricant in the recirculation line to an outer environment surrounding the gear box housing;
      a manifold fluidly coupled to the recirculation line to receive the pressurized lubricant, the manifold including an outlet;
      a first injection line fluidly coupled to the manifold outlet; and
      a first injector fluidly coupled to the manifold outlet to receive the pressurized lubricant; wherein the first injector is configured to deliver the pressurized lubricant to a first gear of the plurality of gears disposed within the gear box;
      wherein the manifold outlet, the first injection line, and the first injector are sized to deliver at least a minimum amount of the pressurized lubricant to the first gear.

2. The power swivel of claim 1, wherein the gear box is configured to be filled with lubricant to a fill line, and wherein the pump is supported within the gear box housing at a position in which the pump is at least partially below the fill line; and wherein the first gear is at least partially above the fill line.

3. The power swivel of claim 1, wherein the motor includes an output shaft configured to rotate at a given speed of rotation, and wherein the pump is coupled to the output shaft of the motor such that the pump is driven at the given, unreduced, speed of rotation to discharge lubricant from the outlet.

4. The power swivel of claim 3, wherein the motor is rotatable in a first direction, and a second direction that is opposite the first direction; and
wherein the pump is configured to discharge lubricant from the outlet and into the recirculation line when the motor is rotating in the first direction, and wherein the pump is further configured to discharge lubricant from the outlet and into the recirculation line when the motor is rotating in the second direction.

5. The power swivel of claim 1, wherein the lubrication system further comprises:
a second injector, wherein the second injector is configured to deliver the pressurized lubricant to a bearing disposed within the gear box housing; and
wherein the manifold is coupled to the second injector.

6. The power swivel of claim 5, wherein the manifold comprises: an inlet fluidly coupled to the recirculation line; and a plurality of outlets; and wherein the lubrication system further comprises:
a pressure relief valve fluidly coupled to one of the plurality of outlets and configured to emit lubricant to the environment surrounding the gear box housing when the pressure of the lubricant within the manifold reaches a predetermined value.

7. A power swivel configured to rotate a tubular string and drill bit to form or extend a subterranean borehole, the power swivel comprising:
a motor having an output shaft extending along a shaft axis, wherein the motor lies on the shaft axis;
a gear box coupled to the motor, the gear box configured to be filled with lubricant to a fill line and comprising: a gear box housing having an internal surface; and a plurality of gears disposed within the gear box housing; and
a lubrication system coupled to the gear box, the lubrication system including:
a pump including an outlet, wherein the pump is supported from the internal surface of the housing and aligned with the shaft axis of the motor and configured so as to be driven by the shaft to discharge lubricant from the outlet;
a recirculation line fluidly coupled to the outlet of the pump, wherein at least a portion of the recirculation line extends outside of the gear box housing to facilitate a transfer of thermal energy from lubricant in the recirculation line to an outer environment surrounding the gear box housing; and
a first injector fluidly coupled to the recirculation line, wherein the first injector is configured to deliver lubricant directly onto a first gear of the plurality of gears; and
wherein the pump is supported from the internal surface in the gear box at least partially below the fill line; and wherein the first gear is partially above the fill line.

8. The power swivel of claim 7, wherein the motor is rotatable in a first direction, and a second direction that is opposite the first direction; and
wherein the pump is configured to discharge lubricant from the outlet and into the recirculation line when the motor is rotating in the first direction, and wherein the pump is further configured to discharge lubricant from the outlet and into the recirculation line when the motor is rotating in the second direction.

9. The power swivel of claim 7, wherein the lubrication system further comprises:
a second injector fluidly coupled to the recirculation line, wherein the second injector is configured to deliver lubricant to a bearing disposed within the gear box housing; and
a manifold positioned outside the gear box housing, the manifold having an inlet and a plurality of outlets wherein the inlet is fluidly coupled to the recirculation line; and
wherein the first injector is fluidly coupled to a first outlet of the plurality of outlets; and wherein the second injector is fluidly coupled to a second outlet of the plurality of outlets.

10. The power swivel of claim 9, wherein the manifold is mounted to the gear box housing at a position that is above the fill line and above the pump.

11. The power swivel of claim 9, wherein the lubrication system further comprises a pressure relief valve fluidly coupled to one of the plurality of manifold outputs and is configured to emit lubricant to the environment surrounding the gear box housing when the pressure of the lubricant within the manifold reaches a predetermined limit.

12. A power swivel configured to rotate a tubular drill string comprising:
a motor rotatable in a first direction and in a second direction that is opposite the first direction;
a gear box coupled to the motor, the gear box comprising a gear box housing having an internal surface and comprising a plurality of gears disposed within the gear box housing; and
a lubrication system coupled to the gear box, the lubrication system comprising:
a pump including a pump housing disposed within the gear box housing and supported from the internal surface, wherein the pump includes an outlet and is configured to be driven by the motor and to discharge lubricant from the outlet when the motor is rotating in the first direction and wherein the pump is further configured to discharge lubricant from the outlet when the motor is rotating the second direction;
a recirculation line fluidly coupled to the outlet of the pump to receive a pressurized lubricant that is discharged from the outlet, at least a segment of the recirculation line extending outside the gear box;
a manifold fluidly coupled to the recirculation line to receive the pressurized lubricant, the manifold including an outlet;
a first injection line fluidly coupled to the manifold outlet; and
a first injector fluidly coupled to the manifold outlet to receive the pressurized lubricant and configured to deliver the pressurized lubricant to at least one of a gear and a bearing disposed within the gear box;
wherein the manifold outlet, the first injection line, and the first injector are sized to deliver at least a minimum amount of the pressurized lubricant to the at least one of the gear and the bearing.

13. The power swivel of claim 12, wherein the gear box is configured to be filled with lubricant to a fill line, wherein the pump is disposed within the gear box at least partially below the fill line; and wherein the gear and the bearing are at least partially above the fill line.

14. The power swivel of claim 13, wherein the lubrication system further comprises:
- a first fluid delivery line fluidly coupled to the first injector and that is configured to deliver the preassurized lubricant to the gear; and
- a second injector fluidly coupled to the manifold and to a second fluid delivery line that is configured to deliver the preassurized lubricant to the bearing;
- wherein the first and second fluid delivery lines and the first and second injectors are configured to deliver at least a predetermined minimum amount of the preassurized lubricant to the gear and bearing when the motor is operating at a minimum output.

15. The power swivel of claim 14 further comprising a pressure relief valve coupled to the manifold and configured to emit lubricant outside of the lubrication system if the pressure of the lubricant within the manifold exceeds a predetermined limit.

16. The power swivel of claim 12 wherein the recirculation line is metal and comprises heat transfer elements.

17. The power swivel of claim 12 wherein the segment of the recirculation line extending outside the gear box is configured to be cooled by a coolant.

\* \* \* \* \*